(12) United States Patent     (10) Patent No.: US 11,062,004 B2
Gordon et al.     (45) Date of Patent: Jul. 13, 2021

(54) EMOTION-BASED DATABASE SECURITY

(71) Applicant: INTERNATIONAL BUSINESS MACHINES CORPORATION, Armonk, NY (US)

(72) Inventors: Itai Gordon, Modiin (IL); Gil Fuchs, Mevaseret Zion (IL); Ilan D. Prager, Beit Shemesh (IL); Yoav Ben-Yair, Mevaseret Zion (IL); Shlomit Avrahami, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 15/966,473

(22) Filed: Apr. 30, 2018

(65) Prior Publication Data

US 2019/0332752 A1     Oct. 31, 2019

(51) Int. Cl.
    *G06F 21/32*     (2013.01)
    *G06F 21/31*     (2013.01)
    *G06F 21/57*     (2013.01)
    *G06F 21/56*     (2013.01)

(52) U.S. Cl.
    CPC .......... *G06F 21/32* (2013.01); *G06F 21/316* (2013.01); *G06F 21/566* (2013.01); *G06F 21/577* (2013.01); *G06F 2221/032* (2013.01)

(58) Field of Classification Search
    CPC ...... G06F 21/32; G06F 21/316; G06F 21/577; G06F 21/566; G06F 21/552; G06F 2221/032
See application file for complete search history.

(56) References Cited

U.S. PATENT DOCUMENTS

| 7,114,079 B1 * | 9/2006 | Cook ................... G07C 9/257 |
| | | 713/186 |
| 7,999,857 B2 | 8/2011 | Bunn et al. |

(Continued)

OTHER PUBLICATIONS

Lee et al., "New Approach for Detecting Leakage of Internal Information; Using Emotional Recognition Technology", Nov. 2015, pp. 4662-4679, KSII Transactions on Internet and Information Systems, vol. 9, No. 11.

(Continued)

*Primary Examiner* — Chau Le
(74) *Attorney, Agent, or Firm* — Dmitry Paskalov

(57) ABSTRACT

A computer-implemented method is provided. The method may include determining a behavioral pattern of a user based on historical data access events and historical data access conditions corresponding to the historical data access events, wherein the data access events are associated with a computer enterprise system. A data access request from the user with respect to a secure resource may be received from a computing node connected to the computer enterprise system. A behavioral state of the user may be determined with respect to the data access request and data access conditions corresponding to the data access request. A discrepancy between the behavioral pattern and the behavioral state of the user may be detected. A security risk level may be determined based on the discrepancy. In response to determining that the security risk level exceeds a predetermined threshold, a security action may be performed with respect to the secure resource.

20 Claims, 5 Drawing Sheets

(56) References Cited

U.S. PATENT DOCUMENTS

| | | | | |
|---|---|---|---|---|
| 8,295,542 | B2* | 10/2012 | Albertson | G06K 9/00335 382/103 |
| 8,887,300 | B1* | 11/2014 | Gates | H04L 63/10 713/168 |
| 9,563,271 | B1* | 2/2017 | Ben-Yair | G06F 3/013 |
| 9,621,677 | B1* | 4/2017 | Bradley | G06F 21/00 |
| 9,641,544 | B1* | 5/2017 | Treat | H04L 63/1425 |
| 9,760,767 | B1* | 9/2017 | Bonazzoli | A61B 5/0077 |
| 10,776,467 | B2* | 9/2020 | Chan | G06F 16/24575 |
| 10,881,965 | B2* | 1/2021 | Tran | A63F 13/70 |
| 2006/0143647 | A1* | 6/2006 | Bill | G06F 16/683 725/10 |
| 2007/0067853 | A1* | 3/2007 | Ramsey | G06F 21/316 726/28 |
| 2010/0316265 | A1* | 12/2010 | Nakanowatari | G06K 9/00288 382/118 |
| 2011/0225650 | A1 | 9/2011 | Margolies et al. | |
| 2012/0204257 | A1* | 8/2012 | O'Connell | G06F 21/316 726/19 |
| 2012/0224057 | A1 | 9/2012 | Gill et al. | |
| 2014/0201122 | A1* | 7/2014 | Park | H04N 21/4667 706/46 |
| 2016/0232402 | A1* | 8/2016 | Jiang | G06K 9/00295 |
| 2016/0234232 | A1* | 8/2016 | Poder | H04L 63/1416 |
| 2016/0330217 | A1* | 11/2016 | Gates | H04L 63/08 |
| 2018/0075291 | A1* | 3/2018 | Tian | G06K 9/00268 |
| 2018/0107880 | A1* | 4/2018 | Danielsson | G06K 9/00268 |

OTHER PUBLICATIONS

Joo et al., "Emotion Detection Algorithm Using Frontal Face Image", Jul. 2015, pp. 2373-2378, International Conference on Control, Automation and Systems, Jun. 2-5, Kintex, Gyeonggi-Do, Korea, ResearchGate, https://www.researchgate.net/publication/228870902.

Kulkarni et al., "Facial Expression (Mood) Recognition From Facial Images Using Committee Neural Networks", Aug. 5, 2009, 12 Pages, BioMedical Engineering Online, 2009, vol. 8, No. 16, http://www.biomedical-engineering-online.com/content/8/1/16.

Choudhary, "Introduction to Anomaly Detection", Feb. 14, 2017, 17 Pages, datascience.com, https://www.datascience.com/blog/python-anomaly-detection.

Mell et al., "The NIST Definition of Cloud Computing", NIST, Sep. 2011, 7 Pages, Special Publication 800-145, U.S. Department of Commerce, Gaithersburg, MD.

Butalia et al., "Facial Expression Recognition for Security", Jul.-Aug. 2012, pp. 1449-1453, International Journal of Modern Engineering Research (IJMER), vol. 2, Issue 4, www.ijmer.com.

* cited by examiner

EMOTION-BASED DATABASE SECURITY

BACKGROUND

The present invention relates generally to the field of database security, and in particular to data security management.

An enterprise or organization may possess assets or resources including sensitive, protected, confidential, or at-risk data and/or information by which various operations may be conducted. The data may be made available to insiders (i.e., persons, individuals, or members of the enterprise) for handling and processing, for example, to perform functions and activities to support the operations. The insiders may include, for example, employees and contractors of the enterprise. Making the data available or otherwise accessible to the insiders may threaten the security, privacy, and integrity of the data and put the enterprise at risk of potential damages and losses. For example, a data breach or data leak may occur as a result of particular actions taken by an insider in handling and processing the data if the actions violate or deviate from associated data security rules, procedures, and practices. The data leak may cause exposure, loss, or compromise of the data such as by allowing for its unauthorized collection, distribution, theft, or corruption.

An enterprise may implement various computer, network, and/or data security controls to protect and maintain the confidentiality and integrity of sensitive data. For example, the security controls may be implemented to protect and maintain the security of the data as well as computer systems by which the data may be stored and handled or otherwise made available. The security controls may include, for example, rules for restricting or limiting access to the data such as based on predetermined levels of data sensitivity, which may be enforced by requiring corresponding levels of data or access privilege, permission, or clearance in order for access to the data to be granted. In some instances, the sensitive data may be accessed without restriction by trusted insiders that possess the appropriate permissions. The data access permissions may be assigned to insiders based on, for example, job, task, role, duty, function, level of seniority, or the like. Accordingly, the sensitive data may be secured and made available to the insiders so as to reduce the associated risk to the enterprise.

Unfortunately, not every trusted insider may be trustworthy, as instances of insiders acting against enterprises have increasingly shown. Such instances may include, for example, insiders causing data leakage events. A data leakage event (e.g., a data or security breach) may include and be caused by, for example, acts of stealing and/or related acts that may be performed by an insider to obtain possession of or control over data belonging to an enterprise, such as for external distribution or exposure of the data, or to otherwise compromise the confidentiality and integrity of the data. For example, an insider may cause a data leakage event by accessing, collecting, and externally distributing sensitive data of an enterprise to an industry competitor.

SUMMARY

According to an aspect of the present invention, a computer-implemented method is provided. The method may include determining a behavioral pattern of a user based on historical data access events and historical data access conditions corresponding to the historical data access events, wherein the data access events are associated with a computer enterprise system. A data access request from the user with respect to a secure resource may be received from a computing node connected to the computer enterprise system. A behavioral state of the user may be determined with respect to the data access request and data access conditions corresponding to the data access request. A discrepancy between the behavioral pattern and the behavioral state of the user may be detected. A security risk level may be determined based on the discrepancy. In response to determining that the security risk level exceeds a predetermined threshold, a security action may be performed with respect to the secure resource.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
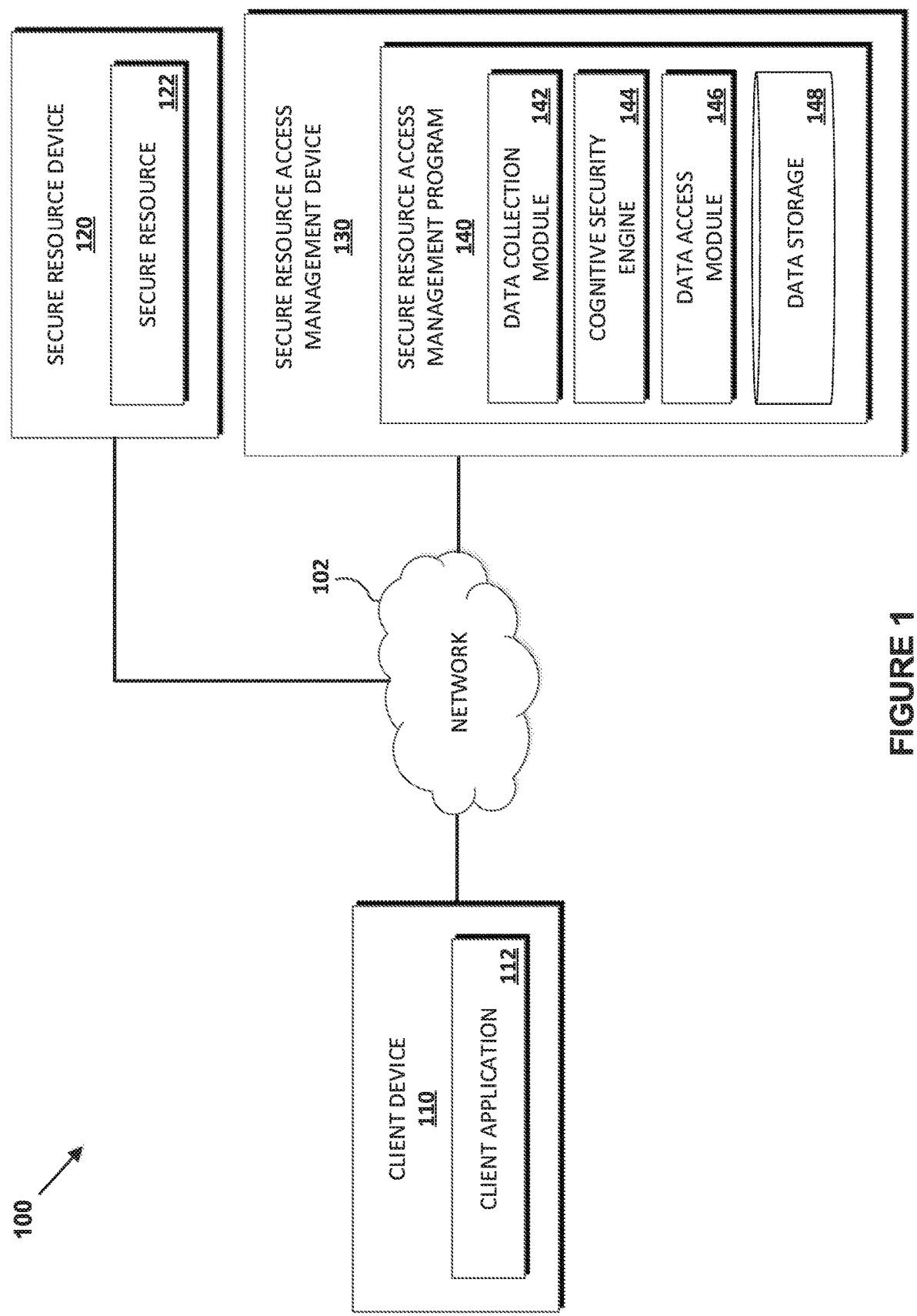
FIG. 1 is a functional block diagram depicting a security management system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

An enterprise may implement a computer system such as an enterprise computer system, for example, to host data, and/or to otherwise store, handle, process, and communicate the data to support and facilitate availability and use of the data by insiders of the enterprise. The insiders may act on the data by providing inputs to the computer system with respect to the data to control and direct the hosting of the data so as to perform actions to support the everyday activities, functions, and operations of the enterprise. The computer system may include, for example, an internal network and computing environment having one or more computing platforms, data handling systems, database systems, data storage systems, and networking systems by which the data may be hosted. The computer system may also include, for example, a security system such as a computer, network, and/or data security system by which a secured boundary (e.g., a firewall) may be established for protecting and maintaining the security and integrity of the data, as well as the internal network and computing environment by which the data may be hosted. For example, the secured boundary may be established to protect the computer system from attacks initiated external to the secured boundary. The security system may include, for example, a security management system.

The security management system may monitor and control incoming and outgoing data and network traffic between a trusted internal network (e.g., the internal network and computing environment of the enterprise computer system) and an untrusted external network. The incoming and outgoing network traffic may be monitored and controlled, for example, based on a first set of predetermined security rules that may be defined, generated, and provided for enforcement with respect to the secured boundary. The security management system may also monitor and control data and network traffic throughout the trusted internal network. The internal data and network traffic may be monitored and controlled, for example, based on a second set of predetermined security rules that may be defined, generated, and provided for enforcement with respect to the network and computing environment within the secured boundary. The first and second sets of predetermined security rules may be distinctly defined according to the different conditions and security requirements of the secured boundary and the internal network and computing environment, respectively.

Generally, the second set of predetermined security rules may be less restrictive than the first set of predetermined security rules with respect to the monitoring and control of the data and network traffic. For example, the second set of security rules may be less restrictive so as to not inhibit or impede the availability and use of the data by the insiders of the enterprise. The less restrictive characteristics of the second set of predetermined security rules may be provided, in part, by the data access permissions possessed by the trusted insiders of the enterprise. Under certain conditions, the less restrictive characteristics may, for example, produce a security vulnerability that may be exploited by a trusted insider to perform acts to cause a data leakage event while appearing to be dissociated from its occurrence.

Accordingly, there is a need in the art for a method to predict or determine the occurrence of an impending data leakage event that may be caused by a trusted insider. Determining that the data leakage event may occur may allow for preemptive actions to be taken to prevent the event and to otherwise mitigate consequences that may arise as a result of the event.

Embodiments of the present invention are directed to a method for detecting a security threat to protect a secure resource. In various aspects, the method may include monitoring user access requests and corresponding user access conditions associated with the user and the secure resource, and determining a user behavior pattern associated with the user access requests and corresponding user access conditions. A user behavioral state associated with a user access request and corresponding user access conditions may be determined, where the user behavior pattern and the user behavioral state may include emotion patterns and emotional states of the user. A discrepancy between the user behavior pattern and the user behavioral state may be detected. A security risk level may be determined, with respect to the user access request, based on the discrepancy. A security risk level may be determined with respect to the user access request based on the discrepancy. The security threat may be detected based on the security risk level. A protective security action may be performed with respect to the secure resource based on the security threat. In an aspect, the method may include determining an emotional state of the user based on a facial image of the user.

Advantageously, the present invention may be implemented to improve computer, network, and data security by enabling data security threat detection based on a user's interactions and corresponding emotions (i.e., behaviors) with respect to a secured resource. In particular, the improvement is provided by rules that enable detection of a security threat based on a discrepancy in the emotions of the user, with respect to the secured resource, that may be identified based on facial images of the user. Accordingly, the improvement provides capabilities to automated data security threat detection systems that previously did not exist. Additional advantages of the present invention may be readily apparent to those of skill in the art as described herein.

FIG. 1 is a functional block diagram depicting a security management system 100, in accordance with an embodiment of the present invention. The security management system 100 may include a client device 110, a secure resource device 120, and a secure resource access management device 130, each interconnected over a network 102. While FIG. 1 depicts three discrete devices, other arrangements may be contemplated. For example, the client device 110, the secure resource device 120, and/or the secure resource access management device 130 may include one or more integrated or distinct devices.

In various embodiments of the present invention, the network 102 may include, for example, an intranet, a local area network (LAN), a personal area network (PAN), a wireless local area network (WLAN), a wireless personal area network (WPAN), a wireless mesh network, a wide area network (WAN) such as the Internet, or the like. The network 102 may include wired, wireless, or fiber optic connections. Generally, the network 102 may include any combination of connections and protocols for supporting communications between the client device 110, the secure resource device 120, and the secure resource access management device 130, in accordance with embodiments of the present invention.

In various embodiments of the present invention, the client device 110, the secure resource device 120, and/or the secure resource access management device 130 may include a computing platform or node such as a wearable device, an implantable device, a mobile or smart phone, a tablet computer, a laptop computer, a desktop computer, a server such as a database server, a virtual machine, or the like. In the various embodiments, the client device 110, the secure resource device 120, and/or the secure resource access management device 130 may otherwise include any other type of computing platform, computer system, or information system capable of sending and receiving data to and from another device, such as by way of the network 102. In certain embodiments, the client device 110, the secure resource device 120, and/or the secure resource access management device 130 may include internal and external hardware components, such as described with reference to FIG. 3. In other embodiments, the client device 110, the secure resource device 120, and/or the secure resource access management device 130 may be implemented in a cloud computing environment, such as described with reference to FIGS. 4 and 5.

In an embodiment of the present invention, the client device 110 may include, for example, a client computing platform that hosts a client application 112. In the embodiment, the client device 110 may include, for example, an image-capture device such as a camera (not depicted). The client device 110 may implement a combination of devices and technologies such as network devices and device drivers to support the operation of the client application 112 and the camera, and to provide a platform enabling communications between the client device 110, the secure resource device 120, and/or the secure resource access management device 130, in accordance with embodiments of the present invention.

The client application 112 may include, for example, an application or program such as a software program, one or more subroutines contained in a program, an application programming interface, or the like. In an embodiment of the present invention, the client application 112 may be implemented by a user to, for example, query, access, or request access to data and resources over a network. For example, the client application 112 may be implemented by the user to communicate an access request over the network 102. The data and resources may include those stored or hosted on a computing platform such as a database server connected to the network 102. The data and resources may include, for example, a secure resource 122 which may be stored or hosted on the secure resource device 120, as depicted in FIG. 1.

The camera may include, for example, a camera or video camera as such may be integrated into a computing platform or device such as a mobile or smart phone, a tablet computer, a laptop computer, a desktop computer, or the like. In an embodiment of the present invention, the camera may be implemented to generate image-capture data. The image-capture data may include, for example, captured or recorded images and video including facial expressions and gestures of a user of the client device 110. The user may include, for example, a person or individual such as an insider, employee, or contractor of an enterprise. The client application 112 may be, for example, required by a security protocol or rules of the network 102 in order to access the data and resources over the network. The camera may operate under the control of client application 112.

In an embodiment of the present invention, the secure resource device 120 may include, for example, a computing platform that hosts the secure resource 122. The secure resource device 120 may implement a combination of devices and technologies such as network devices and device drivers to support the operation and availability of the secure resource 122, and to provide a platform enabling communications between the client device 110, the secure resource device 120, and/or the secure resource access management device 130, in accordance with embodiments of the present invention.

The secure resource 122 may include, for example, an application or program such as a software program, one or more subroutines contained in a program, an application programming interface, or the like. In an embodiment of the present invention, the secure resource 122 may include, for example, data and resources such as sensitive, protected, confidential, at-risk, sensitive, secured, or controlled-access data and resources that may be made accessible or otherwise available over a network such as the network 102. The secure resource 122 may include, for example, enterprise or organizational data and/or software programs that may be implemented in supporting various functions, activities, processes, and/or operations of an enterprise or organization. The data and resources may be made accessible over the network 102, for example, in response to a request for access as such request may be received from a client such as the client application 112. The secure resource 122 may be, for example, stored, processed, accessed, handled, distributed, and/or manipulated directly or by way of an application such as a database management system.

In an embodiment of the present invention, the secure resource access management device 130 may include, for example, a computing platform that hosts a secure resource access management program 140. The secure resource access management device 130 may implement a combination of devices and technologies such as network devices and device drivers to support the operation of the secure resource access management program 140, and to provide a platform enabling communications between the client device 110, the secure resource device 120, and/or the secure resource access management device 130, in accordance with embodiments of the present invention.

The secure resource access management program 140 may include, for example, an application or program such as a software program, one or more subroutines contained in a program, an application programming interface, or the like. The secure resource access management program 140 may be implemented to monitor and control database and user access activities, and events that may be caused by the activities, as such may be associated with data and resources such as the secure resource 122. The secure resource access management program 140 may include a data collection module 142, a cognitive security engine 144, a data access module 146, and a data storage 138.

The data collection module 142 collects data related to user access requests. The data collection module 132 may store the retrieved data in the data storage 148 for later retrieval and use.

In an embodiment of the present invention, the collected data may include user access request data associated with a user, along with user access conditions data and image-capture data corresponding to the user access request data. In the embodiment, the collected data may also include historical user access request data associated with the user, along with historical user access conditions data and historical image-capture data corresponding to the historical user access request data. In the embodiment, the user access request data may include data related to a query or transaction seeking access to data and resources, such as the secure resource 122, residing on the secure resource device 120. In the embodiment, the user access request data may include an identifier associated with the user. The user may include a person or individual of an enterprise (i.e., an insider).

In an embodiment of the present invention, the user access conditions data may include, for example, data related to contextual and environmental conditions associated with a user access request of a user. The contextual conditions may include, for example, calendar or scheduled events corresponding to a time of the user access request, such as a time and date of a meeting involving the user. The environmental conditions may include, for example, a network connection quality and speed by which the user access request of a user was communicated, such as with respect to the network 102 and the client device 110.

In an embodiment of the present invention, the image-capture data may include, for example, data corresponding to frontal facial images of a user associated with user access requests. In the embodiment, the image-capture data may be obtained, for example, by the camera of the client device 110 at a time corresponding to the received user access request.

The cognitive security engine 144 determines a behavioral pattern of the user associated with user access requests and corresponding user access conditions, determines a behavior state of the user associated with a user access request and corresponding user access conditions, detects a discrepancy between the user behavior state and the user behavior pattern, and determines a security risk level associated with the user access request based on the discrepancy and a sensitively level of a secure resource such as the secure resource 122. The user behavior pattern and the user behavior state may include emotional patterns and states of the user, respectively.

For example, the cognitive security engine 144 may implement a classifier that may be trained based on training data that may be classified in terms of patterns of behavior corresponding to potential security risks. Various classification algorithms or techniques may be used to classify the training data, which may involve the use of, for example, factor analyses algorithms, exploratory factor analyses algorithms, principal component analyses algorithms, neural networks, maximum likelihood estimation algorithms, various types of multivariate statistical methods, support vector machines, random forest, and/or deep feature synthesis algorithms. The appropriate choice of the training data, the classifications, and the predefined security criteria may be chosen as a matter of design choice, based, for example, on security industry best practices.

The data access module 146 detects a security threat based on the security risk level and a security or policy protocol, determines and generates commands for executing a protective security action based on the security threat, and performs the protective security action with respect to the secure resource. In an embodiment of the present invention, the data access module 146 may include, for example, a database activity monitor, a file activity monitor, an application activity monitor, a user activity monitor, and the like. In the embodiment, the data access module 146 may include, for example, a policy engine by which to determine and generate the commands for executing the protective security action.

Figure 2:
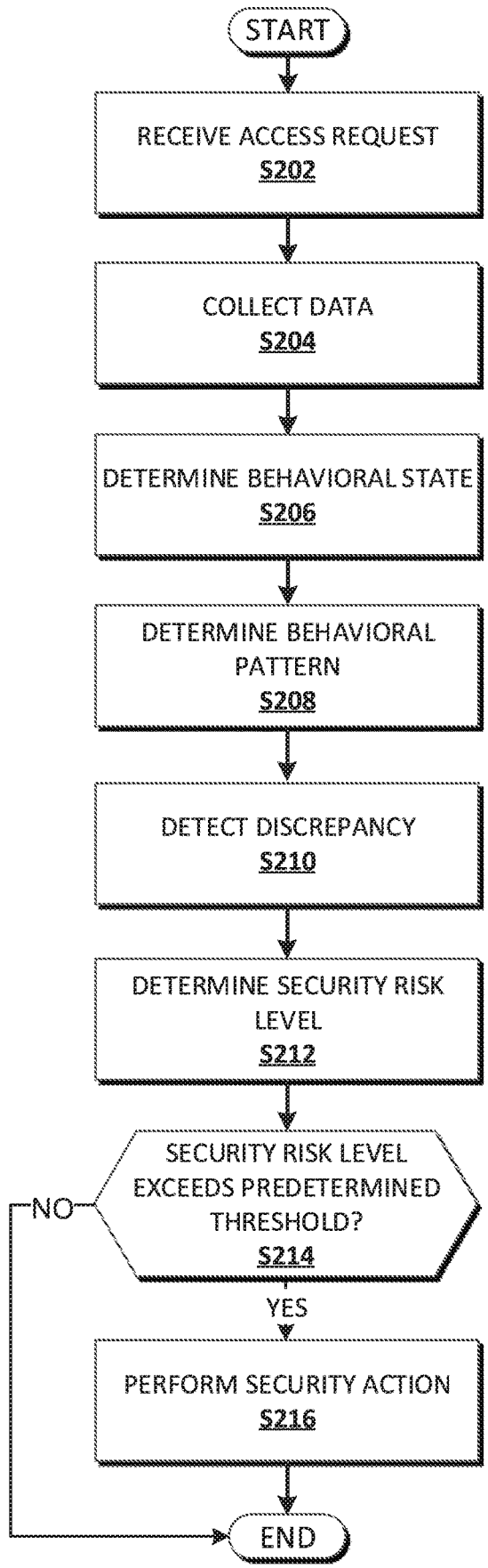
FIG. 2 is a flowchart depicting operational steps of an aspect of the security management system, in accordance with an embodiment of the present invention.

FIG. 2 is a flowchart depicting operational steps of an aspect of the security management system 100, in accordance with an embodiment of the present invention.

At step S202, a user or data access request is received from a user. The user access request may be received by the secure resource device 120 over the network 102, and may be communicated or sent from the client device 110 from the user by way of the client application 112. The user access request may include, for example, query or access data corresponding to the user access request.

At step S204, the data collection module 142 collects the data related to the user access request and the associated user. For example, the data collection module 142 may implement one or more crawlers or other programs and methods to periodically run database queries with respect to the secure resource device 120 to collect the data. In an embodiment of the present invention, the data may be collected for continuous monitoring of user access requests and corresponding user access conditions associated with individual users and the secure resource.

In an embodiment of the present invention, the collected data may include current and historical user access request data associated with the user, along with current and historical user access conditions data and current and historical image-capture data corresponding to the current and historical user access request data. The current and historical user access request data, user access conditions data, and image-capture data may be collected based on an identifier of the user such as may be received with the user access request. In the embodiment, the data collection module 142 may also collect data associated with a population of users similar to the user associated with the user access request. For example, the population of users may include users having similar data access permissions. Generally, the population of users may be identified as a matter of design.

At step S206, the cognitive security engine 144 determines a behavioral state of the user associated with the received user access request.

Facial expressions may provide cues to emotions or moods experienced by a person (i.e., a user) when accessing data and resources such as the secure resource 122, during a real-time conversation (e.g., during a video conferencing session), while the person is reading or composing an email message or other form of written communication, and so on. Facial expression recognition systems may be used to identify a person or characteristics of the person (e.g., the age and gender of the person), recognize facial expressions performed by the person over time (e.g., by matching selected facial features or expressions with images stored in a facial expression database), and determine (or infer) an emotional state of the person based on the facial expressions performed by the person over time. A facial expression recognition system may detect expressions associated with facial features (e.g., eyes, eyebrows, nose, or mouth) and changes in facial feature expressions (e.g., changes in the geometric relationships between the eyes and eyebrows or nose and mouth) using machine-learning based techniques. As movement of facial muscles that lead to particular facial expressions may be involuntarily or unintentionally performed by a person in a particular emotional state, the particular facial expressions may be a reliable indicator of the person's particular emotional state.

In an embodiment of the present invention, the behavioral state of the user may be determined with respect to the user access request data associated with the user and the secure resource 122. In the embodiment, the behavioral state of the user may be determined based on the user access conditions data and the image capture data corresponding to the user access request data. The behavioral state of the user may include or be determined based on an emotional state of the user. For example, the emotional state of the user may be determined to be happy, sad, angry, fearful, surprised, and/or disgusted.

In an embodiment of the present invention, the emotional state of the user may be determined based on user access conditions data and image-capture data corresponding to the user access request data of the user. In the embodiment, the cognitive security engine 144 may implement a facial expression recognition system and an emotion detection algorithm to determine the emotional state of the user. The emotional state of the user may be determined based on the image-capture data corresponding to the user. In the embodiment, the image-capture data may include facial image data associated with the user with respect to times at which the received user access request was received. For example, the image-capture data may include visual image data representing the user's face or facial region during, near, and at a time at which the user communicated the user access request or otherwise caused the user access request to be received. In the embodiment, the emotional state of the user may be determined with respect to contextual and environmental conditions associated with the user access request.

In an embodiment of the present invention, the emotional state of the user may be determined based on a biometric measure of the user. The biometric measure may include, for example, a heart rate or a blood pressure measurement. For example, the heart rate or blood pressure measurement may be determined based on data received from an application residing on the client device 110. The application may include, for example, a heart rate or blood pressure monitoring application.

For example, the cognitive security engine 144 may determine, based on computations by the emotion detection algorithm with respect to the image-capture data, that an emotional state of a user is angry with respect to a user access request. The emotional state of the user may be determined to be affected by associated user access conditions data indicating poor network connection quality and speed by which the user access request was communicated.

At step S208, the cognitive security engine 144 determines a behavioral pattern of the user associated with the received user access request. In the embodiment, the behavioral pattern of the user may be determined with respect to the historical user access request data associated with the user and the secure resource 122. In the embodiment, the behavioral pattern of the user may be determined based on the historical user access conditions data and the historical image capture data corresponding to the historical user access request data. In an embodiment of the present invention, the behavioral pattern of the user may be determined based on a sequence of determined behavioral states of the user. For example, the behavioral pattern may be determined based on a sequence of determined emotional states of the user with respect to the secure resource 122.

At step S210, the cognitive security engine 144 detects a discrepancy or anomaly between the determined behavioral state and the determined behavioral pattern of the user. In an embodiment of the present invention, the discrepancy may include a deviation in the behavioral state of the user with respect to the behavioral pattern of the user. The discrepancy may be indicative of one or more potential security risks posed by the user. The cognitive security engine 144 may implement, for example, various types of statistical methods along with anomaly detection algorithms such as those that may be density-based, clustering-based, support vector machine-based, random forest-based, and/or deep feature synthesis-based. Generally, the methods and algorithms used may be chosen as a matter of design.

For example, a discrepancy may be detected where a behavioral pattern of a user with respect to the secure resource device 120 is determined to include mostly happy emotions, and a behavioral state of the user with respect to the secure resource device 120 is determined to include a fearful emotion.

In an embodiment of the present invention, the discrepancy may be detected, for example, based on determined behavioral states and patterns of the user preceding a grant of access to the secure resource 122 with respect to determined behavioral states and patterns of the user following a grant of access to the secure resource 122.

In an embodiment of the present invention, the discrepancy may be detected, for example, based on determined behavioral states and patterns of users of a population of users similar to the user associated with the user access request.

In an embodiment of the present invention, the discrepancy may be detected, for example, by granting partial access to the secure resource 122. For example, sensitive data may be randomly redacted or masked in order to examine a user's emotional response to the redacted or masked data.

At step S212, the cognitive security engine 144 determines a security risk level associated with the user access request based on the discrepancy and a sensitivity level of a secure resource such as the secure resource 122.

In an embodiment of the present invention, the security risk level may be determined based on the determined behavioral state and pattern of the user, the detected discrepancy between the behavioral state and pattern, and a data sensitivity level of the secure resource 122. The data sensitivity level may be, for example, predetermined based on a security or policy protocol.

At step S214, the data access module 146 determines whether the security risk level associated with the user access request meets or exceeds a predetermined threshold. In an embodiment of the present invention, the data access module 146 may detect a security threat based on a corresponding predetermined threshold that is met or exceeded by an associated security risk level. As an example, predetermined thresholds may be defined in qualitative terms (e.g., values) corresponding to low, intermediate, and high security risk level. The predetermined thresholds may be defined, for example, according to a security or policy protocol. Generally, the manner in which predetermined thresholds are defined with respect to security risk levels may be chosen as a matter of design. Where the security risk level does not exceed a predetermined threshold, the method ends.

At step S216, the data access module 146 determines and generates commands for executing a protective security action based on the security threat, and performs the protective security action with respect to the secure resource.

In an embodiment of the present invention, the protective security action may be determined based on whether the security risk level associated with the user access request meets or exceeds one or more predetermined thresholds. In the embodiment, the protective security action may include, for example, setting and enforcing a level of access such as by granting or denying access to the user access request. In the embodiment, the protective security action may include, for example, granting partial access to the user access request, such as by blocking or masking portions of the secure resource 122. In the embodiment, the protective security action may include, for example, generating and communicating an alert. In the embodiment, the protective security action may include continuous monitoring of the user access requests and corresponding user access conditions associated with the user and the secure resource.

Figure 3:
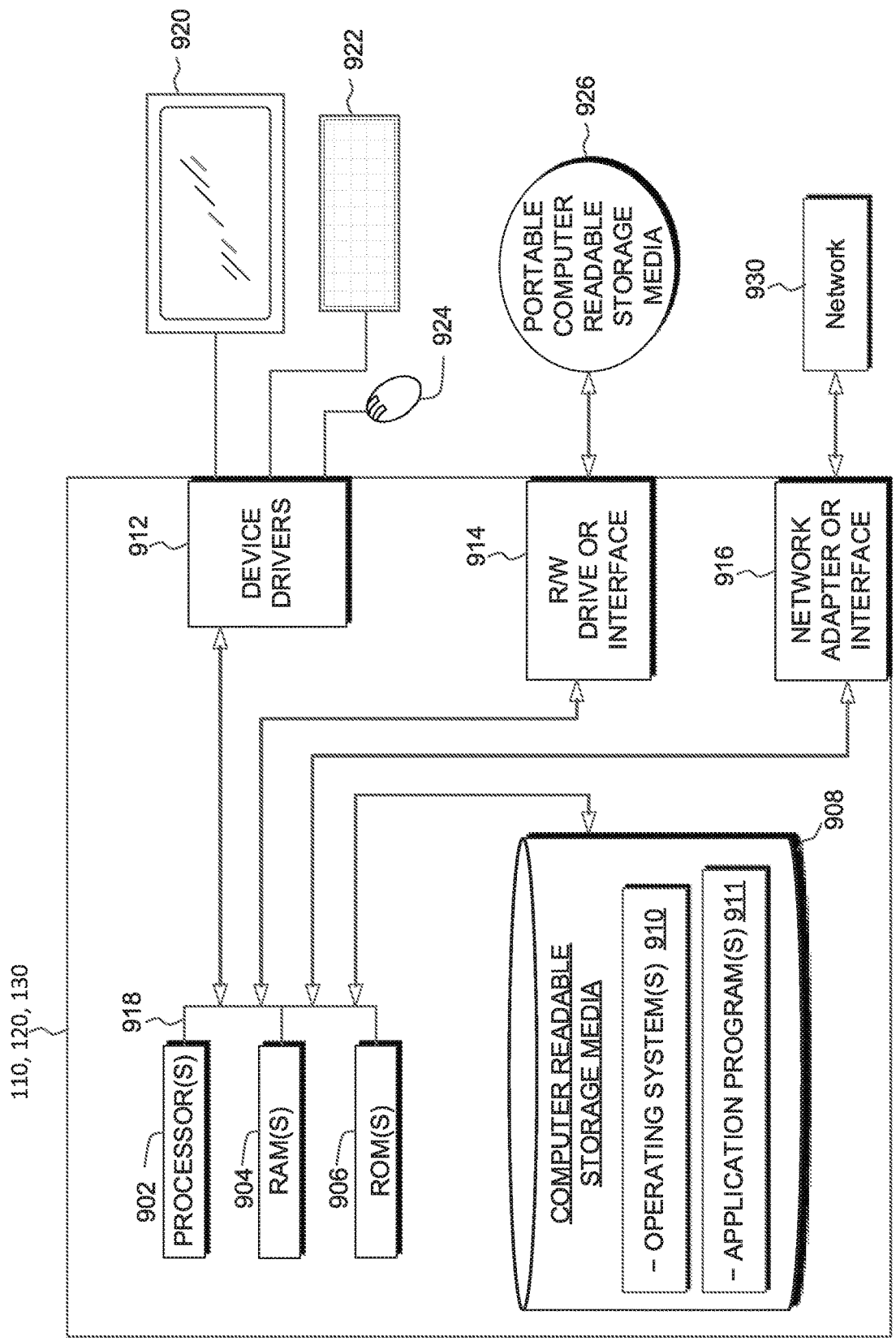
FIG. 3 is a block diagram depicting a client device, a secure resource device, and/or a secure resource access management device, in accordance with an embodiment of the present invention.

FIG. 3 is a block diagram depicting a client device 110, a secure resource device 120, and/or a secure resource access management device 130, in accordance with an embodiment of the present invention. As depicted in FIG. 3, the client device 110, the secure resource device 120, and/or the secure resource access management device 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as the secure resource access management program 140 residing on the secure resource access management device 130, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The client device 110, the secure resource device 120, and/or the secure resource access management device 130 may also include a R/W drive or interface 914 to read from and write to one or more portable computer readable storage media 926. Application programs 911 on the client device 110, the secure resource device 120, and/or the secure resource access management device 130 may be stored on one or more of the portable computer readable storage media 926, read via the respective R/W drive or interface 914 and loaded into the respective computer readable storage media 908. The client device 110, the secure resource device 120, and/or the secure resource access management device 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. The client device 110, the secure resource device 120, and/or the secure resource access management device 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

The secure resource access management device 130 can be a standalone network server, or represent functionality integrated into one or more network systems. In general, the client device 110, the secure resource device 120, and/or the secure resource access management device 130 can be a laptop computer, desktop computer, specialized computer server, or any other computer system known in the art. In certain embodiments, the secure resource access management device 130 represents computer systems utilizing clustered computers and components to act as a single pool of seamless resources when accessed through a network, such as a LAN, WAN, or a combination of the two. This implementation may be preferred for data centers and for cloud computing applications. In general, client device 110, secure resource device 120, and secure resource access management device 130 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
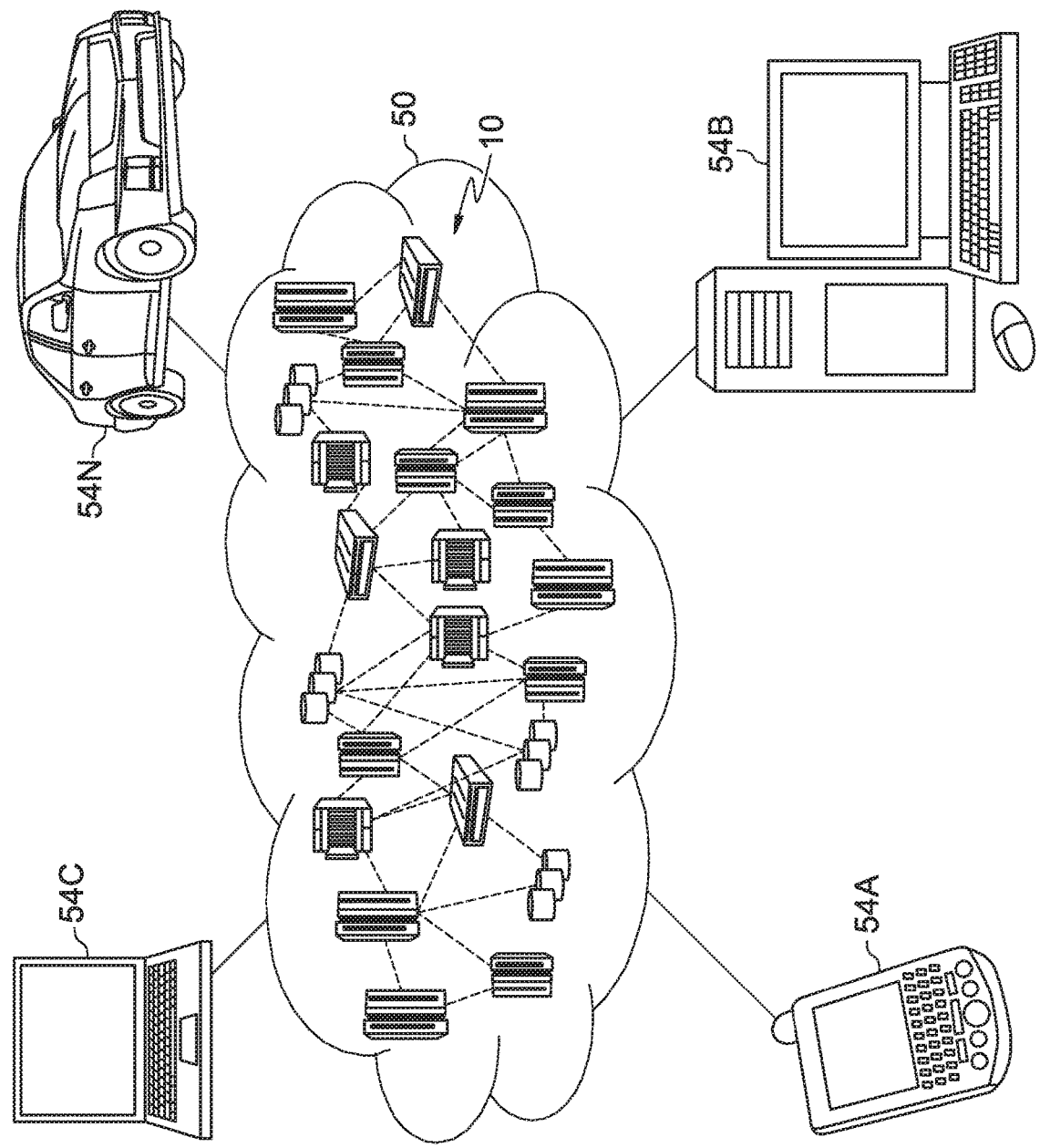
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
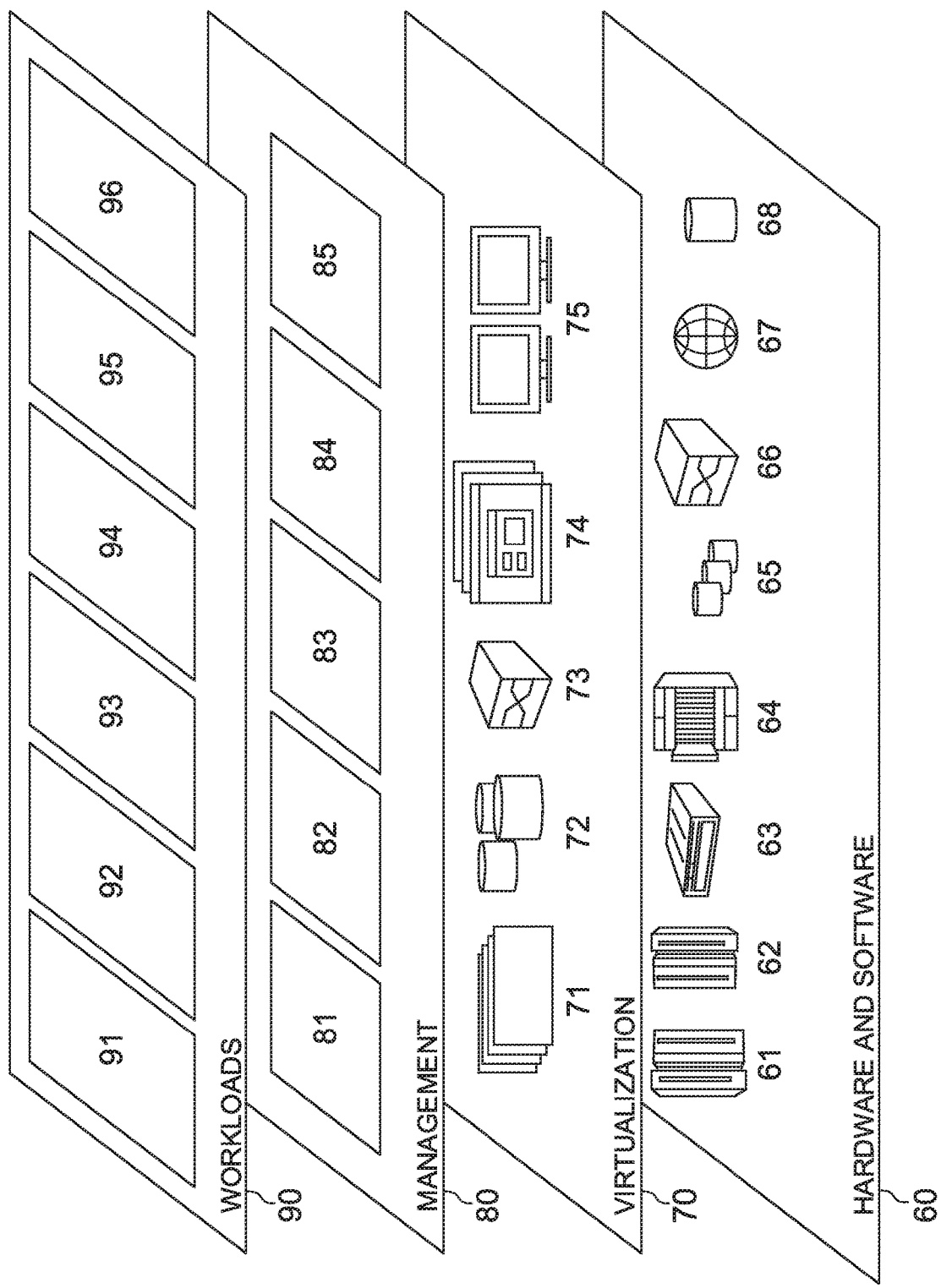
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure resource access management 96. Secure resource access management 96 may include functionality for enabling the cloud computing environment to perform steps of the disclosed method, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method, the method comprising:
  determining a behavioral pattern of a user and a behavioral pattern of population of users having similar data access permissions based on historical data access events and historical data access conditions corresponding to the historical data access events, wherein the data access events are associated with a computer enterprise system;

receiving, from a computing node connected to the computer enterprise system, a data access request from the user with respect to a secure resource;

determining a behavioral state of the user and a behavioral state of the population of users having the similar data access permissions with respect to the data access request and data access conditions corresponding to the data access request, wherein the behavioral state of the user is based on a facial expression that is determined by applying a machine-learning emotion detection algorithm to image-capture data of a facial image of the user that was captured during the data access request from the user;

detecting a discrepancy between the behavioral pattern and the behavioral state of the user, wherein the discrepancy is detected based on an anomaly of the behavioral pattern and the behavioral state of the user to the behavioral pattern and the behavioral state of the population of users having the similar data access permissions;

determining a security risk level based on the discrepancy; and in response to determining that the security risk level exceeds a predetermined threshold, performing a security action with respect to the secure resource.

2. The method of claim 1, wherein the behavioral pattern and the behavioral state of the user are further determined based on corresponding emotional states of the user, and an emotional state of the user is determined by applying an emotion detection algorithm to the image-capture data corresponding to the user.

3. The method of claim 2, wherein the image-capture data comprises facial image data associated with the user at times at which the user caused the data access request and historical data access requests corresponding to the secure resource to be received.

4. The method of claim 2, wherein the discrepancy further comprises a deviation in emotion corresponding to the behavioral state of the user with respect to the behavioral pattern of the user.

5. The method of claim 4, wherein the discrepancy is further detected based on historically determined behavioral states and patterns of the user preceding corresponding grants of access to the secure resource, with respect to historically determined behavioral states and patterns of the user following the corresponding grants of access to the secure resource.

6. The method of claim 1, wherein the discrepancy further comprises a deviation in emotion corresponding to the behavioral state of the user with respect to behavioral patterns of users having an identical job role as the user.

7. The method of claim 6, wherein the discrepancy is further detected based on historically determined behavioral states and patterns of the user preceding corresponding grants of access to the secure resource, with respect to historically determined behavioral states and patterns of the users having the identical job role as the user preceding corresponding grants of access to the secure resource.

8. A computer system, the computer system comprising:
one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:

determining a behavioral pattern of a user and a behavioral pattern of population of users having similar data access permissions based on historical data access events and historical data access conditions corresponding to the historical data access events, wherein the data access events are associated with a computer enterprise system;

receiving, from a computing node connected to the computer enterprise system, a data access request from the user with respect to a secure resource;

determining a behavioral state of the user and a behavioral state of the population of users having the similar data access permissions with respect to the data access request and data access conditions corresponding to the data access request, wherein the behavioral state of the user is based on a facial expression that is determined by applying a machine-learning emotion detection algorithm to image-capture data of a facial image of the user that was captured during the data access request from the user;

detecting a discrepancy between the behavioral pattern and the behavioral state of the user, wherein the discrepancy is detected based on an anomaly of the behavioral pattern and the behavioral state of the user to the behavioral pattern and the behavioral state of the population of users having the similar data access permissions;

determining a security risk level based on the discrepancy; and in response to determining that the security risk level exceeds a predetermined threshold, performing a security action with respect to the secure resource.

9. The computer system of claim 8, wherein the behavioral pattern and the behavioral state of the user are further determined based on corresponding emotional states of the user, and an emotional state of the user is determined by applying an emotion detection algorithm to the image-capture data corresponding to the user.

10. The computer system of claim 9, wherein the image-capture data comprises facial image data associated with the user at times at which the user caused the data access request and historical data access requests corresponding to the secure resource to be received.

11. The computer system of claim 9, wherein the discrepancy further comprises a deviation in emotion corresponding to the behavioral state of the user with respect to the behavioral pattern of the user.

12. The computer system of claim 11, wherein the discrepancy is further detected based on historically determined behavioral states and patterns of the user preceding corresponding grants of access to the secure resource, with respect to historically determined behavioral states and patterns of the user following the corresponding grants of access to the secure resource.

13. The computer system of claim 8, wherein the discrepancy further comprises a deviation in emotion corresponding to the behavioral state of the user with respect to behavioral patterns of users having an identical job role as the user.

14. The computer system of claim 13, wherein the discrepancy is further detected based on historically determined behavioral states and patterns of the user preceding corresponding grants of access to the secure resource, with respect to historically determined behavioral states and patterns of the users having the identical job role as the user preceding corresponding grants of access to the secure resource.

15. A computer program product, the computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:
determining a behavioral pattern of a user and a behavioral pattern of population of users having similar data access permissions based on historical data access events and historical data access conditions corresponding to the historical data access events, wherein the data access events are associated with a computer enterprise system;
receiving, from a computing node connected to the computer enterprise system, a data access request from the user with respect to a secure resource;
determining a behavioral state of the user and a behavioral state of the population of users having the similar data access permissions with respect to the data access request and data access conditions corresponding to the data access request, wherein the behavioral state of the user is based on a facial expression that is determined by applying a machine-learning emotion detection algorithm to image-capture data of a facial image of the user that was captured during the data access request from the user;
detecting a discrepancy between the behavioral pattern and the behavioral state of the user, wherein the discrepancy is detected based on an anomaly of the behavioral pattern and the behavioral state of the user to the behavioral pattern and the behavioral state of the population of users having the similar data access permissions;
determining a security risk level based on the discrepancy; and
in response to determining that the security risk level exceeds a predetermined threshold, performing a security action with respect to the secure resource.

16. The computer program product of claim 15, wherein the behavioral pattern and the behavioral state of the user are further determined based on corresponding emotional states of the user, and an emotional state of the user is determined by applying an emotion detection algorithm to the image-capture data corresponding to the user.

17. The computer program product of claim 16, wherein the image-capture data comprises facial image data associated with the user at times at which the user caused the data access request and historical data access requests corresponding to the secure resource to be received.

18. The computer program product of claim 16, wherein the discrepancy further comprises a deviation in emotion corresponding to the behavioral state of the user with respect to the behavioral pattern of the user.

19. The computer program product of claim 18, wherein the discrepancy is further detected based on historically determined behavioral states and patterns of the user preceding corresponding grants of access to the secure resource, with respect to historically determined behavioral states and patterns of the user following the corresponding grants of access to the secure resource.

20. The computer program product of claim 15, wherein the discrepancy further comprises a deviation in emotion corresponding to the behavioral state of the user with respect to behavioral patterns of users having an identical job role as the user.

\* \* \* \* \*